United States Patent [19]

Truong

[11] Patent Number: 5,258,843
[45] Date of Patent: Nov. 2, 1993

[54] METHOD AND APPARATUS FOR OVERLAYING DISPLAYABLE INFORMATION

[75] Inventor: Loc Truong, Santa Ana, Calif.

[73] Assignee: Texas Instruments Incorporated, Dallas, Tex.

[21] Appl. No.: 801,973

[22] Filed: Dec. 3, 1991

Related U.S. Application Data

[63] Continuation of Ser. No. 486,339, Feb. 28, 1990, Pat. No. 5,099,331, which is a continuation of Ser. No. 93,462, Sep. 4, 1987, Pat. No. 4,907,086.

[51] Int. Cl.⁵ ............................................. H04N 5/272
[52] U.S. Cl. ..................................... 358/183; 358/22; 345/114
[58] Field of Search ................. 358/22, 182, 183, 185; 340/734, 791, 799

[56] References Cited

U.S. PATENT DOCUMENTS

| | | | |
|---|---|---|---|
| 4,218,710 | 8/1980 | Kashigi | 358/22 |
| 4,360,831 | 11/1982 | Kellar | 358/182 |
| 4,568,981 | 2/1986 | Beaulier | 358/183 |
| 4,680,630 | 7/1987 | Field | 358/183 |
| 4,907,086 | 3/1990 | Truong | 358/183 |
| 5,099,331 | 3/1992 | Truong | 358/183 |

Primary Examiner—Tommy P. Chin
Attorney, Agent, or Firm—Robert D. Marshall, Jr.; James C. Kesterson; Richard L. Donaldson

[57] ABSTRACT

A video system is disclosed which is capable of receiving digital data from a source such as a video camera, and subsequently transferring the received data into a main frame buffer for display on a video display, where the data from the source can overlay a primary image stored in the main frame buffer. An auxiliary frame buffer, consisting of a bank of dual-port RAMs, receives the data of the overlay image via its serial port and transfers this data into the randomly accessible array therein. A direct-memory-access (DMA) operation performs the transfer from the auxiliary frame buffer into the main frame buffer, with the source and destination positions in the auxiliary and main frame buffers, respectively, independently selectable. The performance of the DMA operation can be enhanced by simultaneously performing a page mode read of the auxiliary frame buffer with a page mode write to the main frame buffer.

9 Claims, 3 Drawing Sheets

METHOD AND APPARATUS FOR OVERLAYING DISPLAYABLE INFORMATION

This application is a continuation of U.S. patent application Ser. No. 07/486,339 filed Feb. 28, 1990, now U.S. Pat. No. 5,099,331, which is a continuation of U.S. patent application Ser. No. 07/093,462 filed Sep. 4, 1987, now U.S. Pat. No. 4,907,086.

This invention is in the field of data processing systems, specifically as directed to such systems which visually display digital information.

BACKGROUND OF THE INVENTION

Modern data processing systems generally provide visual output by way of such output devices as cathode-ray tubes (CRTs). The performance of such systems can be enhanced when the visual display can receive information from more than one source, and which can overlay the information received from a first source (background) with the information received from a second source (foreground). The overlaying of such information can especially by useful where only a portion of the background information is hidden by the foreground information, as where the foreground information occupies a "window" of the display, and where the information hidden by the foreground window is not irretrievably lost.

It is especially useful in such systems to overlay the output of a data processing system with a dissimilar source, such as a digitized signal from a video camera. In such a system using a real-time source such as a video camera, it is preferable that the overlaying and display of the foreground information occur on a real-time basis, in order to take full advantage of the video camera input.

Referring to FIGS. 1a and 1b, prior methods for displaying images from multiple sources are illustrated. FIG. 1a illustrates the overlaying of information from multiple digital sources 2. The output of each digital source 2 can represent the video data in the well-known RGB (red-green-blue) format. Digital-to-analog converters 4 receive the RGB information from each of digital sources 2, and convert the digital RGB information into analog signals for each of the elements therein. The output of the DACs 4 is then received by an analog mixer 6, which selects among the signals from the mutiple DACs 4 as required for the overlaying of information among the digital sources 2. FIG. 1b illustrates a second system, containing frame buffers 8 which store bit-mapped representations of the information to be displayed on the video output device. Each of frame buffers 8 communicate with a data source (not shown), such as a host processing unit or the digitized output of a video camera, by way of its parallel port 10; each of frame buffers 8 also have, as is well known in the art, a serial port 12 for communicating the bit-mapped data to the video display. Serial ports 12 are received by a digital mixer 14, which constitutes a multiplexing function (or another operation on the serial digital data received, such as a logical OR) on each of the digital values presented by serial ports 12 thereto. The output of digital mixer 12 is applied to a DAC 16, for providing the analog RGB output as in FIG. 1a for application to a video display device.

A problem in each of the prior methods shown in FIGS. 1a and 1b is the synchronization of data from the multiple sources. The data presented to each of the mixers (analog mixer 6 of FIG. 1a, and digital mixer 14 of FIG. 1b) from each of the sources must correspond to the same position on the video display, thereby requiring that the data from the foreground source must be presented at the same rate as, and synchronized with, the data from the background source. This places constraints on the data arriving from the foreground source, as the video display position of the foreground image must coincide with the position of the hidden portion of the background image. This requires that the foreground image be buffered, and thereby delayed, to coincide with the operation of the video display as controlled for the background image.

It is therefore an object of this invention to provide a system for overlaying a foreground image onto a background iamge, without requiring that the display positions of the two images be synchronized.

It is another object of this invention to provide such a system which allows the foreground image to be input from a real-time source, such as a video camera.

It is yet another object of this invention to provide such a system which allows the overlaying of the foreground image in selectable positions of the background image, such selection being transparent to the receipt and transmission of the foreground image.

Other objects and advantages of the instant invention will be apparent to those of ordinary skill in the art having reference to the following specification in conjunction with drawings.

SUMMARY OF THE INVENTION

The invention may be incorporated into a video display system having a first frame buffer for storing a displayable image and for communicating the stored image to a video output device, and having a second frame buffer for receiving data representing a foreground image to be overlayed onto the image stored in the first frame buffer. The second frame buffer has a serial input for receiving the foreground image data, and has a random access output connected to a data bus; the randon access input of the first frame buffer is also connected to the data bus. The second frame buffer is operable to receive and store the foreground image asynchronously from the operation of the first frame buffer. At such time as the foreground image is to be transferred to the first frame buffer, a direct-memory-access (DMA) transaction takes place over the data bus. An address latch may be provided to the second frame buffer, loadable from the data bus prior to the DMA operation, for storing the memory locations of the second frame buffer to be read in the DMA operation; a similar latch may be provided to the first frame buffer for storing the memory locations of the first frame buffer to which the data is to be written in the DMA operation. The independent control of the addresses allow the second frame buffer to receive, store and transfer the image without being synchronized with the video display position of the first frame buffer. Additional interface may be provided to each of the frame buffers for image processing on the data stored therein, as desired, such image processing capable of being done asynchronously relative to the other frame buffer.

DETAILED DESCRIPTION OF THE INVENTION

Figure 2:
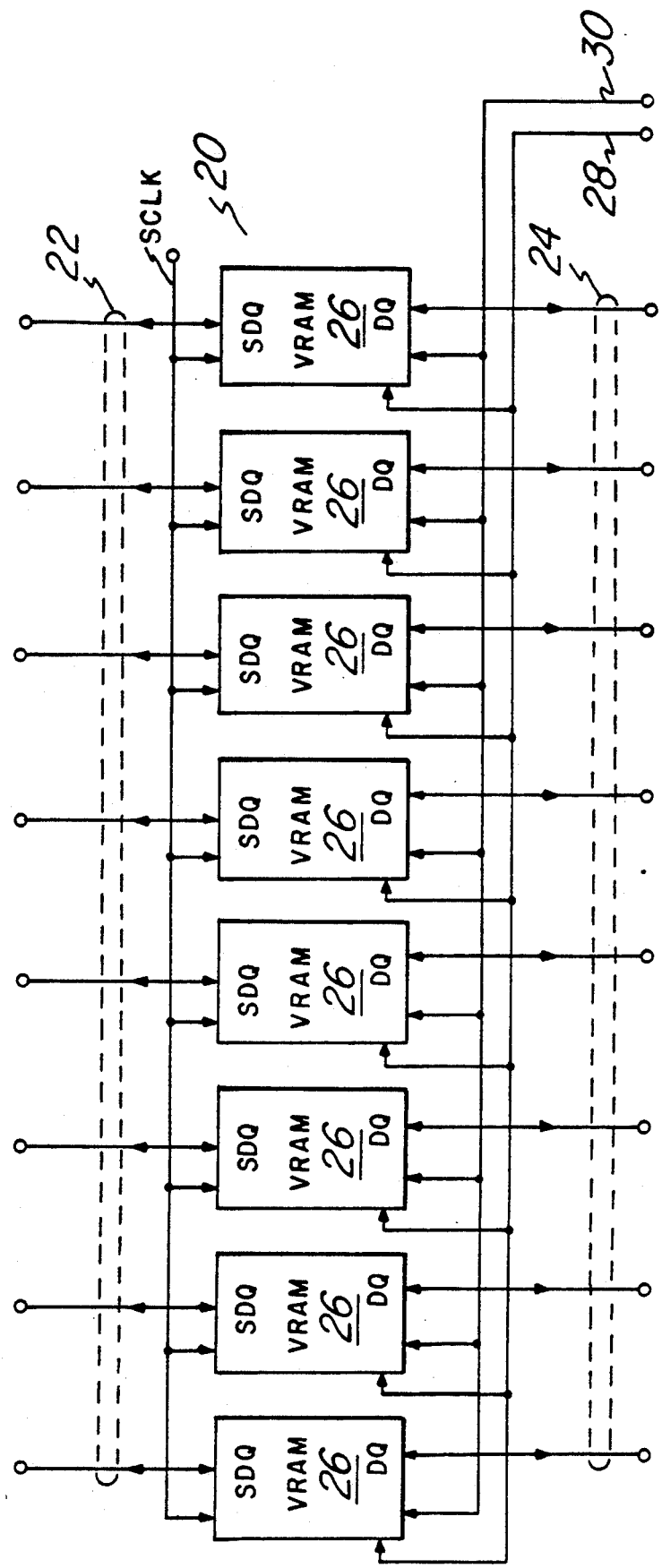
FIG. 2 is an electrical diagram, in block form, of a frame buffer as incorporated into the invention.

FIG. 2 illustrates, in block form, a frame buffer 20 as used in the system to be described below. The frame buffer 20 of FIG. 2 has a serial port 22, and a parallel port 24, each of which may receive and present data from video RAMs (VRAMs) 26 comprising frame buffer 20. VRAMs 26 are 64 k by 4 dual-port dynamic random access memories, such as the TMS 4461 video RAM manufactured and sold by Texas Instruments Incorporated, and such as the device described in U.S. Pat. No. 4,636,986 issued Jan. 13, 1987 and assigned to Texas Instruments Incorporated. VRAM 26 has four random access input/output terminals DQ, and and has four serial input/output terminals SDQ, allowing random and serial access to occur independently and asynchronously relative to one another. As described in said U.S. Pat. No. 4,636,986, each VRAM 26 can transfer data from a selected row of memory data in the random access array to a register, for the serial output from serial port 22, and can receive serial data from serial port 22 into the register, for transfer into a row of the random access array therein. Serial port 22 of frame buffer 20 constitutes the four serial input/output terminals SDQ from the eight VRAMs 26 therein, providing for the communication of thirty-two bits of data in the form of thirty-two parallel serial data streams. The serial receive or transmit function is controlled for VRAMs 26 by a serial clock signal on line SCLK. Parallel port 24 of frame buffer 20 constitutes the four random access terminals DQ from the eight VRAMs 26 therein, providing for the parallel communication of thirty-two bits of data for each random access of VRAMs 26 therein. Address bus 28 carries address signals to all eight of VRAMs 26 in frame buffer 20, and control bus 30 carries the necessary clock and control signals (such as RAS_, CAS_, WE_, TR_, etc.) to all eight of VRAMs in frame buffer 20.

It should be noted that frame buffer 20 may be comprised of standard (i.e., single random access port) random access memories which provide output to and receive input from discrete shift registers external thereto, in order to accomplish the frame buffering functions. It will become apparent, however, that the performance of dual-port video RAMs makes their use preferable in the system constructed according to the instant invention. In addition, other types of video RAMs, such as the TMS 4161 (a 64 k by 1 dual port memory), or such as the device described in U.S. Pat. No. 4,639,890 issued Jan. 27, 1987 and assigned to Texas Instruments Incorporated, may be utilized in frame buffer 20. It should further be noted that alternate configuration of VRAMs 26 (such as multiple banks of VRAMs 26, each bank selectable by decoded clock signals on serial clock line SCLK and on control bus 30, as is well known in the art) may be incorporated into frame buffer 20 depending upon the size of the bit-mapped display to be stored therein.

Figure 3:
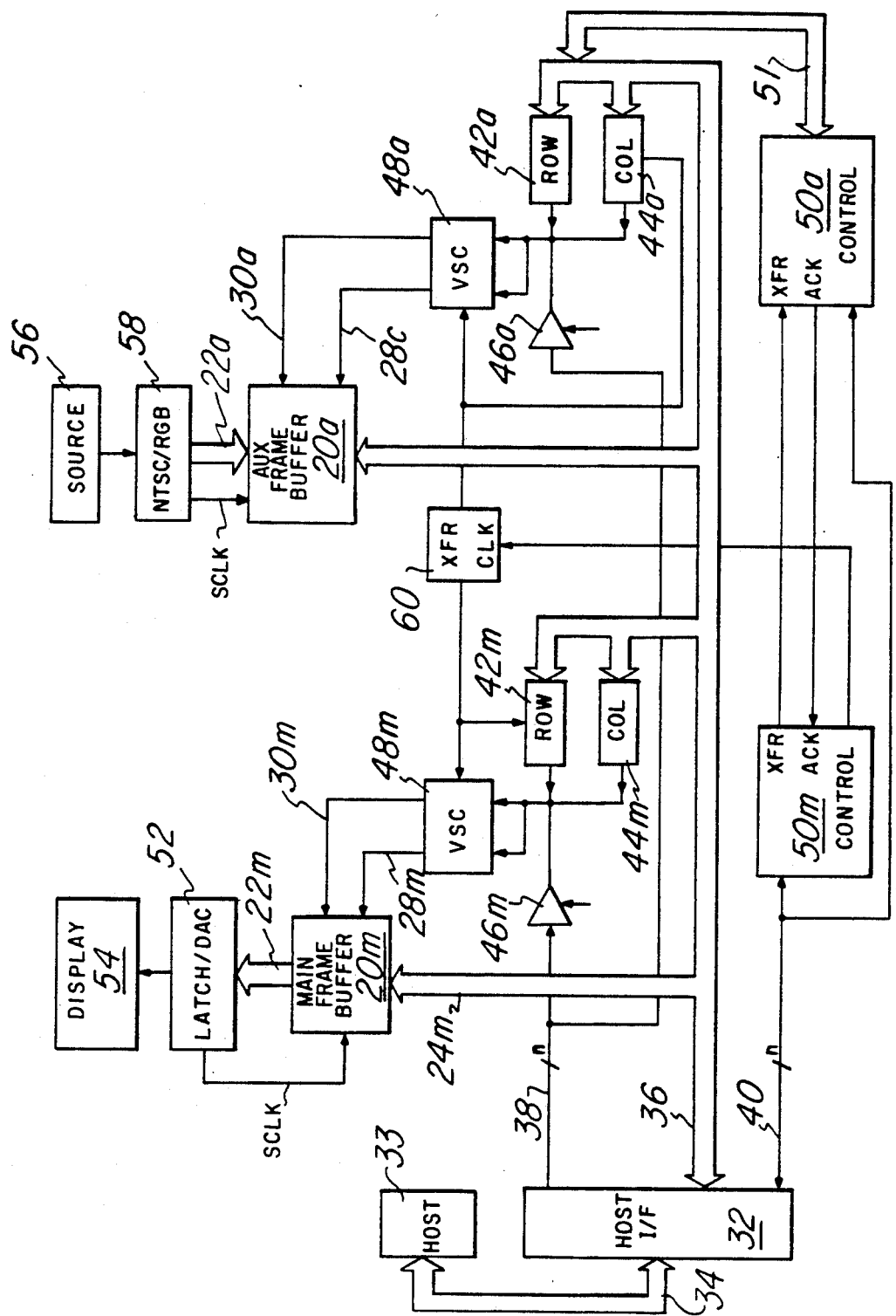
FIG. 3 is an electrical diagram, in block form, of a video display system constructed according to the invention.

Referring now to FIG. 3, a video system constructed according to the invention will be described. Host interface 32 is logic for communicating between the video system and a host computer, such as a personal computer. Bus 34 is a data, address and control bus to which such a personal computer may be connected. Host interface 32 controls the communication from bus 34 to data bus 36, address bus 38 and control bus 40. Parallel port $24_m$ of main frame buffer $20_m$ is connected to data bus 36, for receiving data therefrom and transmitting data thereto. Data bus 36 is further connected to row latch $42_m$ and column latch $44_m$, for communicating the start address of a memory transfer as will be described herein. Address bus 38 is connected to tristate buffer $46_m$. The outputs of row latch $42_m$, column latch $44_m$ and tristate buffer $46_m$ are connected together and communicated to the address inputs of video system controller $48_m$. Video system controller (VSC) $48_m$ is an integrated circuit for controlling the operation of frame buffer $20_m$, and is of the type such as the TMS 34061, manufactured and sold by Texas Instruments Incorporated. VSC $48_m$ is for controlling the operation of frame buffer $20_m$ by the application of address signals thereto via address bus $28_m$, and by the application of control signals via control bus $30_m$. As is well known for the TMS 34061, VSC $48_m$ can, for example, control frame buffer $20_m$ to the extent that intervention of the host computer is not necessary for the refresh of the video display driven thereby. Control logic $50_m$ is connected to control bus 40 from host interface 32, and controls the operation of row latch $42_m$, column latch $44_m$, tristate latch $46_m$, and VSC $48_m$ according to signals on control bus 40; control logic $50_m$ can consist of a programmable logic array, or a microcomputer, depending upon the application, as is well known in the art for controlling a video display. The control lines from control logic $50_m$ to the various other constituents of the display system on the side associated with frame buffer $20_m$ are not shown, for purposes of clarity.

Serial port $22_m$ of frame buffer $20_m$ communicates the output of VRAMs 26 contained therein to latch/DAC circuitry 52. Latch/DAC circuitry 52 is such logic as is well known in the art for the formatting of thirty-two bits of serial data into RGB signals for driving a display 54. Latch/DAC circuitry 52 provides the serial clock signal on line SCLK to control the serial output of data from frame buffer $20_m$ as needed for the display 54. Accordingly, VSC $48_m$, under the control of control logic $50_m$ with addresses driven by way of address bus 38 through tristate latch $46_m$, can receive data from the host computer through host interface 32, and control the writing of this data to frame buffer $20_m$ and eventually to display 54. Once frame buffer $20_m$ stores a bit-mapped representation of the image to be displayed, VSC $48_m$ controls refresh of the image on display 54, and updating of the displayed image as communicated from host interface 32.

In the video system according to the invention, an auxiliary frame buffer $20_a$ is provided for receipt of digital image information from a video source 56, such as a video camera. Video source 56 communicates data to NTSC/RGB decoder and formatter 58. NTSC/RGB decoder/formatter 58 consists of logic for translating data from the format provided by video source 56 (e.g., data according to the NTSC standard), into thirty-two serial data streams of RGB data, in a format suitable for receipt and storage by frame buffer $20_a$, through serial port 22. NTSC/RGB decoder and formatter 58 further generates the serial clock signal on line SCLK for controlling the storing of the serial data into VRAMs 26 within frame buffer $20_a$. Similarly as for frame buffer $20_m$, frame buffer $20_a$ has associated therewith VSC $48_a$, row address latch $42_a$, column address latch $44_a$, tristate buffer $46_a$, and control logic $50_a$. Tristate buffer $46_a$ receives an address signal via address bus 38 from host interface 32, while row and column address latches $42_a$ and $44_a$, respectively, store values presented thereto from data bus 36.

Control logic $50_a$ is for controlling the operation of VSC $48_a$, row address latch $42_a$, column address latch $44_a$, and tristate buffer $46_a$, responsive to control bus 40 from host interface 32, in a manner similar as control logic $50_m$. In addition, control logic $50_a$ communicates with control logic $50_m$ in a "handshaking" manner to effect the transfer of data from frame buffer $20_a$ to frame buffer $20_m$, as will be described hereinbelow. Line XFR carries a signal from control logic $50_m$ to control logic $50_a$ to request a transfer of data from frame buffer $20_a$ to frame buffer $20_m$, and line ACK carries a signal from control logic $50_a$ to control logic $50_m$ indicating that such a transfer is ready to begin. Similarly as control logic $50_m$, control logic $50_a$ may be a logic array; however, it is preferable from the standpoint of independent operation that control logic $50_a$ be a microcomputer such as a TMS 7042 manufactured and sold by Texas Instruments Incorporated, as certain amount of the work in effecting the transfer of data from frame buffer $20_a$ to frame buffer $20_m$ can be facilitated by such a device. Data terminals of control logic $50_a$ may be connected, via address bus 51, to the inputs of row address latch $42_a$ and column address latch $44_a$, so that control logic $50a$ can establish and control, without the intervention of the portion of the system directed to the display, the addressing of the image to be overlayed.

The system of FIG. 3 further includes such timing circuitry as necessary to effect the DMA operation of transferring the overlay image from frame buffer $20_a$ to frame buffer $20_m$. Transfer clock 60 is operable responsive to control signals from control logic $50_m$, to generate the ALE signals to VSCs 48, and to increment the value of the row address latches 42 and column address latches 44. Transfer clock 60 may consist of such circuitry as to also effect the generation of the ALE signals in non-transfer modes, or it may be a redundant clock which is used solely for generating the ALE signals to VSCs 48 during the transfer cycles, with the associated control logic 50 controlling the timing of the operation of VSCs 48 in other operations. As is well known in the art concerning the operation of the TMS 34061, the ALE signal causes VSC 48 to latch the contents of its address and function select pins, and to effect the operative cycle designated thereby. As will be evident from the description below, the operation of the two VSCs in the transfer of image data from frame buffer $20_a$ to frame buffer $20_m$ will be substantially synchronous.

The operation of the system of FIG. 3 in effecting the transfer of data from source 56, through frame buffer $20_a$ to frame buffer $20_m$, and to display 54, accomplishing the overlay of the image stored in frame buffer $20_m$ with the image stored in frame buffer $20_a$, will now be described. As described above, source 56 has communicated data through NTSC/RGB decoder and formatter 58 into the thirty-two serial registers within VRAMs 26 in frame buffer $20_a$. VSC $48_a$ presents the control signals necessary to effect the register-to-memory transfers within VRAMs 26 of frame buffer $20_a$, as well as the row address to which the transferred contents are transferred. This row address can be presented by address bus 38 via tristate latch $46_a$, and stored in one of the registers located within VSC $48_a$ for application to frame buffer $20_a$ and updating by various operations performable by VSC $48_a$. This operation of the receipt and storing of the input data from source 56 is performable independently from and asynchronously with the operation of frame buffer $20_m$, under the control of VSC $48_m$, in refreshing and updating the image displayed by display 54.

Prior to effecting a transfer from frame buffer $20_a$ to frame buffer $20_m$, the address in frame buffer $20_a$ from which the transfer is to begin is loaded into row address latch $42_a$ and column address latch $44_a$ from data bus 36, under the control of control logic $50_a$; the values of the row and column address to be loaded therein may be presented by data from host interface 32, or from control logic $50_a$ itself via bus 51 (if a microcomputer such as a TMS 7042 is used as control logic $50_a$). Tristate buffer $46_a$ is placed in tristate condition by control logic $50_a$, so that address bus 38 will not interfere with the application of the start address by row and column address latches $42_a$ and $44_a$ to VSC $48_a$.

Figure 1A:
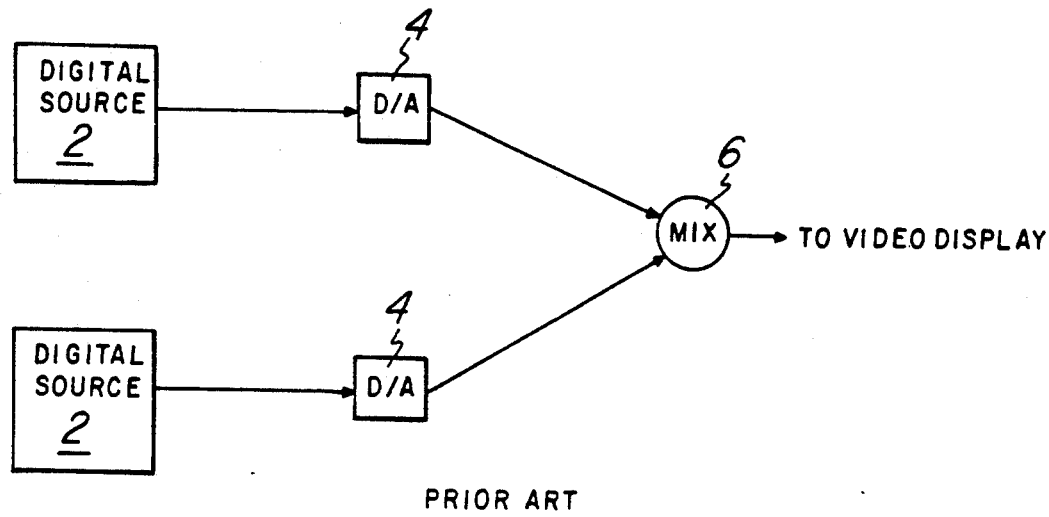
FIGS. 1a and 1b are electrical diagrams, in block form, of video display overlay systems according to the prior art.
Figure 1B:
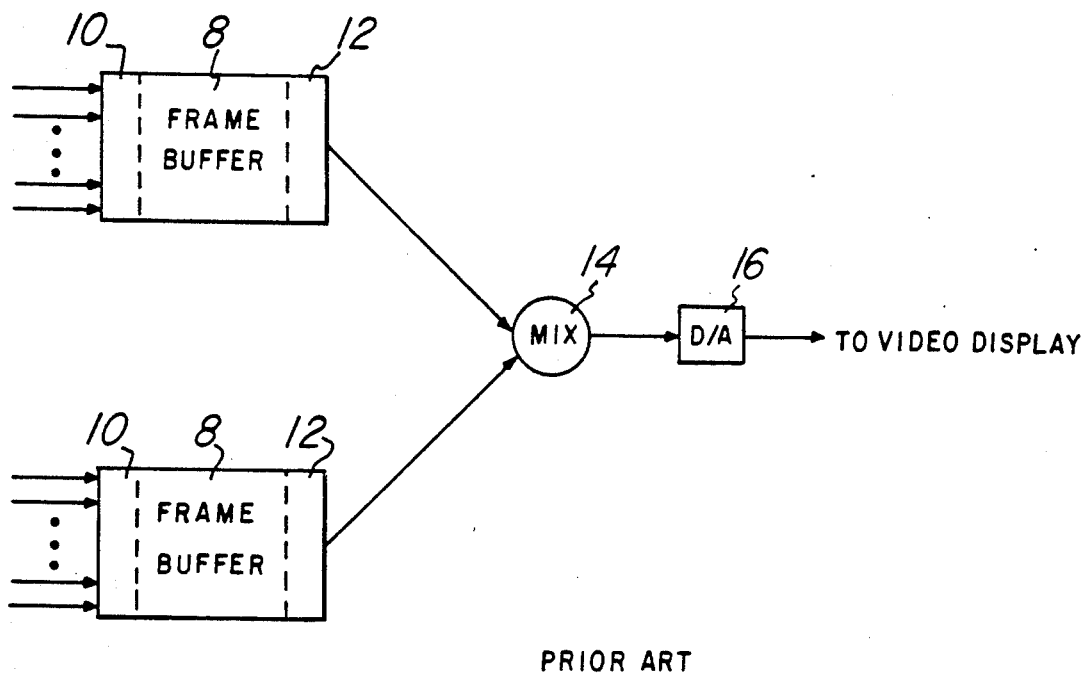

Similarly, row and column address latches $42_m$ and $44_m$ are loaded with the beginning address to which the overlay image is to be stored in frame buffer $20_m$. The provision of separate address latches 42 and 44 for the two frame buffers 20 allow the transfer of data, along the lines of a direct-memory-access operation, with independently specified destination and source address value. Accordingly, unlike the prior art systems discussed hereinabove relative to FIGS. 1a and 1b, the transfer of data from frame buffer $20_a$ to frame buffer $20_m$ does not require that the source location in frame buffer $20_a$ be synchronized with a particular location within frame buffer $20_m$. Instead, a DMA transfer such as is well known in the art, can be effected to place the data from a randomly selected location within frame buffer $20_a$ into a randomly selected location within frame buffer $20_m$.

Once the respective row and column address latches 42 and 44 are loaded with the desired source (frame buffer $20_a$) and destination (frame buffer $20_m$) values, the transfer can begin. The transfer is initiated by control logic $50_m$ issuing a signal on line XFR to control logic $50_a$; such a signal will generally occur when control logic $50_m$ has sensed that a desired operation has stopped on the display side of the system of FIG. 3. Control logic $50_a$ will issue a signal on line ACK when it is available to effect a transfer; the transfer may, of course, be granted priority above, or subject to, other operations performed within the system of FIG. 3. Upon receipt of the signal on line ACK, control logic $50_m$ then activates transfer clock 60, which begins the access of each of frame buffers $20_m$ and $20_a$ via their respective VSCs $48_m$ and $48_a$.

The DMA operation occurs by way of a read of a location in frame buffer $20_a$, and a write operation (of the data read from frame buffer $20_a$) to a location in frame buffer $20_m$. Accordingly, VSC $48_a$ will present an address (along with the necessary clock signals, and with a read signal) to frame buffer $20_a$ according to the values presented by row address latch $42_a$ and column address latch $44_a$; VSC $48_m$ will be presenting an address corresponding to the contents of row address latch $42_m$ and column address latch $44_m$ to frame buffer $20_m$, along with the necessary clocks. Frame buffer $20_a$ will, responsive to the address value, present the contents of the addressed location onto data bus 36 (thirty-two bits wide); thereafter, frame buffer $20_m$ will receive the value on data bus 36 and write it into the address specified by VSC $48_m$. The write signal applied to frame buffer $20_m$ is preferably delayed for a brief period of time after the expected access time of frame buffer $20_a$, so that the data read from frame buffer $20_a$ is stable on data bus 36 prior to the assertion of the write command signal, minimizing the occurrence of erroneous write operations. Such delay may be controlled by VSC $48_m$, as is well known in the art.

The bandwidth of the DMA transfer from frame buffer $20_a$ to frame buffer $20_m$ may be increased by the use of the well known page mode cycle, to access frame buffers $20_a$ and $20_m$. The page mode cycle allows a multiple number of column address cycles to take place without reselecting a row within VRAMs 26 in the frame buffers 20. The cycle time for such a page mode operation thus shortens from 230 nsec for a full cycle to 120 nsec for a page mode cycle, for the TMS 4461 device. Since image data stored in a bit-mapped form generally consists of contiguous columns within a contiguous block of rows, the page mode cycle can generally be used to increase the speed of the transfer.

Upon each cycle, transfer clock 60 increments the contents of the row and column address latches 42 and 44, so that the next cycle has the next successive address. Of course, if the page mode cycle is to be used, logic must be included within the system to increment the column address latches 44 without incrementing the row address latches 42 (except upon the completion of a row access); such logic is easily included by one of ordinary skill in the art, as required for any DMA operation utilizing the page mode feature of dynamic RAMs.

Upon completion of the desired number of transfer cycles, control logic $50_m$ will signal transfer clock 60 that no further cycles for such a transfer are to be performed. Control logic $50_m$ will inactivate the signal on line XFR to control logic $50_a$, and control logic $50_a$ will inactivate the signal on line ACK in response thereto. The system will then return to its normal operating mode, with each of VSCs 48 controlling its associated frame buffer 20 as described above.

Once the DMA operation is complete, the image data from buffer memory $20_a$ is stored at a known location within frame memory $20_m$. Generally the stored location of this data will be in a location of frame memory $20_m$ which is not contained within the bit mapped area of the primary image. As is well known in the art, however, VSC $48_m$ can select the location of the overlay image within frame buffer $20_m$ for display at the location desired in the display. The storage of the overlay data not within the bit-mapped area allows frame memory $20_m$ to retain the data in the first image which is to be overlayed (when overlay is desired) for display at a later time. In this way, the overlay image may be "panned" across the display 54, with the original image data reappearing when the overlay image is moved; the overlay data may also appear in a "window", as is well known in the art, which may be selected by the user of the host system in an interactive manner.

Further modifications to the system of FIG. 3 may of course be included. For example, a separate host interface may be provided for frame buffer $20_a$, similar to host interface 32, so that processing of the image received from source 56 may be done independently from the operation of frame buffer $20_m$ in conjunction with VSC $48_m$ and host interface 32. In addition, multiple auxiliary frame buffers $20_a$ may be provided, with control logic $50_m$ decoding which of the multiple auxiliary frame buffers $20_a$ the DMA operation is to provide the overlay data.

According to the above description, the overlaying of video image data from an external source 56, such as a video camera, onto a bit-mapped representation of display data may be accomplished by using the serial port 22 of an auxiliary frame buffer $20_a$ to receive the serial data from source 56, transferring the data from the serial registers included within such an auxiliary frame buffer $20_a$ into the randomly accessible array therein, and by subsequently executing a DMA operation to place the overlay image data into the master frame buffer $20_m$ for communication to the display 54. Separate designation of the memory addresses in auxiliary frame buffer $20_a$ and main frame buffer $20_m$ allow the overlaying of data in a manner not requiring synchronization of the display positions relative to one another.

Although the invention has been described with reference to an illustrative embodiment, it is to be understood that this description is by way of example only, and is not intended to be construed in a limiting sense. It is to be further understood that numerous changes in the details of the illustrative embodiment, and additional embodiments of the invention, will be apparent to, and may be made by, persons skilled in the art having reference to this description. In addition, it is to be further understood that those skilled in the art may readily substitute present and future equivalent components for those described herein, in order to achieve the same result as the illustrative embodiment. It is contemplated that such changes, substitutions and additional embodiments are within the spirit and scope of the invention as hereinafter claimed.

I claim:

1. A method of overlaying a first displayable image with a second image, comprising:
   storing a bit mapped representation of said first displayable image in a first addressable buffer memory;
   receiving digital data corresponding to said second image;
   storing a bit mapped representation of said second image in a second addressable buffer memory;
   selecting a source location corresponding to the location in said second addressable buffer memory storing said second image;
   selecting a destination location corresponding to the location in said first addressable buffer memory to which the second image is to be stored;
   reading said second image at the source location in said second addressable buffer memory;
   writing the results of said reading step at the destination location in said first addressable buffer memory;
   reading a stream of data from selected locations of said first addressable storage buffer memory in a line by line manner at least some lines including data from said first displayable image and data from said destination location corresponding to said second image; and
   forming a visible display corresponding to said stream of data read from said first addressable storage buffer memory.

2. A video display system that receives foreground images and background images of various speeds and asynchronously operates to show the foreground image overlaying the background image on a video display, comprising:
- a first frame buffer;
- a second frame buffer coupled to the first frame buffer;
- the first frame buffer for initially receiving and storing background image data of a first speed forming the background images, and secondarily receiving and storing data from the second frame buffer, coupled to the video display to provide the background image with the foreground image overlayed thereon;
- the second frame buffer for initially receiving and storing foreground image data of a second speed; and
- control circuitry, coupled to the first frame buffer and the second frame buffer, to asynchronously transfer the foreground data stored in the second frame buffer to the first frame buffer.

3. The video display system of claim 2 wherein the control circuitry includes:
- a first frame video system controller connected to the first frame buffer to direct it; and
- a second frame video system controller connected to the second frame buffer to direct it.

4. The video system of claim 3 wherein the control circuitry further includes:
- first frame control logic connected to the first frame video system controller to direct it;
- second frame control logic connected to the second frame video system controller to direct it, the second frame control logic also being connected to the first frame control logic so that the first frame control logic and the second frame control logic communicate during the asynchronous transfer of the foreground image data in the second frame buffer to the first frame buffer.

5. The video display system of claim 4 wherein the first frame control logic is a programmable logic array and the second frame control logic is a microcomputer.

6. The video display system of claim 4 wherein the first frame control logic is a microcomputer and the second frame control logic is a microcomputer.

7. The video display system of claim 2 wherein the second frame buffer is coupled to the first frame buffer by a data bus that is connected to a host interface, the host interface for communicating with a host computer.

8. The video display system of claim 2 wherein the first frame buffer is comprised of a bank of video random access memories and the second frame buffer is comprised of a bank of video random access memories.

9. The video display system of claim 8 wherein the second frame buffer receives its foreground image data from a video camera.

* * * * *